(12) United States Patent
Giannetti (10) Patent No.: US 9,878,888 B2
(45) Date of Patent: Jan. 30, 2018

(54) WEIGHING DEVICE APPLICABLE MAGNETICALLY TO THE FORK OF A LIFTER WITH WIRELESS DATA CONNECTION

(71) Applicant: NEWTECNIK S.R.L., San Giovanni In Marignano (IT)

(72) Inventor: Mirco Giannetti, Misano Adriatico (IT)

(73) Assignee: Newtecnik S.r.l., San Giovanni in Marginano (RN) (IT)

( * ) Notice: Subject to any disclaimer, the term of this patent is extended or adjusted under 35 U.S.C. 154(b) by 145 days.

(21) Appl. No.: 14/888,755

(22) PCT Filed: Jan. 16, 2014

(86) PCT No.: PCT/IB2014/058330
§ 371 (c)(1),
(2) Date: Nov. 3, 2015

(87) PCT Pub. No.: WO2014/181199
PCT Pub. Date: Nov. 13, 2014

(65) Prior Publication Data
US 2016/0084697 A1    Mar. 24, 2016

(30) Foreign Application Priority Data
May 6, 2013    (IT) ................ PI2013A0036

(51) Int. Cl.
| *G01G 19/08* | (2006.01) |
| *B66F 9/075* | (2006.01) |
| *B66F 9/12* | (2006.01) |
| *H04N 7/18* | (2006.01) |

(52) U.S. Cl.
CPC .............. *B66F 9/0755* (2013.01); *B66F 9/12* (2013.01); *G01G 19/083* (2013.01); *H04N 7/18* (2013.01); *H04N 7/183* (2013.01)

(58) Field of Classification Search
CPC ........ G01G 19/083; B66F 9/0755; B66F 9/12
See application file for complete search history.

(56) References Cited

U.S. PATENT DOCUMENTS

| 4,511,974 A | * | 4/1985 | Nakane | ................. B66F 17/003 340/685 |
| 5,586,620 A | * | 12/1996 | Dammeyer | ........... B66F 9/0755 187/227 |
| 5,986,560 A | * | 11/1999 | Rayburn | .............. G01G 19/083 177/136 |

(Continued)

FOREIGN PATENT DOCUMENTS

| WO | 2007014449 | | 2/2007 | | |
| WO | WO 2012/046259 | * | 4/2012 | ............. B32B 15/06 |

*Primary Examiner* — Natalie Huls
(74) *Attorney, Agent, or Firm* — Themis Law (57) ABSTRACT

The present invention concerns a weighing device applicable in a removable manner to the fork of a fork lift or of a lifter and including an external strip to support the load to weigh; a magnetic element arranged to allow applying magnetically the external strip to the fork; and a weighing device arranged below the external strip in such a way as to detect the weight of a load overlying the external strip. The weighing device is further configured to communicate in wireless modality with an external device for the reading of the datum of the detected weight.

12 Claims, 12 Drawing Sheets

(56) References Cited

U.S. PATENT DOCUMENTS

| | | | | |
|---|---|---|---|---|
| 6,600,111 B2* | 7/2003 | Simons | ............... | G01G 19/083 |
| | | | | 177/139 |
| 6,730,861 B1* | 5/2004 | Simons | ............... | G01G 19/083 |
| | | | | 177/136 |
| 7,659,484 B2* | 2/2010 | Kroll | ................... | G01G 19/083 |
| | | | | 177/130 |
| 8,957,329 B2* | 2/2015 | Simons | ..................... | B62B 3/06 |
| | | | | 177/137 |
| 2003/0234122 A1* | 12/2003 | Kroll | ................... | G01G 19/083 |
| | | | | 177/146 |
| 2004/0139806 A1* | 7/2004 | Christmas | ............... | B66C 13/16 |
| | | | | 73/862.041 |
| 2007/0041820 A1* | 2/2007 | Simons | ..................... | B66F 9/12 |
| | | | | 414/647 |
| 2008/0178690 A1* | 7/2008 | Simons | ................ | G01G 19/083 |
| | | | | 73/862.541 |
| 2010/0057593 A1* | 3/2010 | Moir | ................... | G01G 19/083 |
| | | | | 705/29 |
| 2011/0067502 A1* | 3/2011 | Simons | ................ | B66F 17/003 |
| | | | | 73/862.045 |
| 2013/0101167 A1* | 4/2013 | Holeva | ................ | G06T 7/0085 |
| | | | | 382/103 |
| 2013/0277151 A1* | 10/2013 | Giannetti | ................ | B32B 15/06 |
| | | | | 187/237 |
| 2016/0083232 A1* | 3/2016 | Giannetti | ............. | B66F 9/0755 |
| | | | | 348/148 |
| 2017/0261364 A1* | 9/2017 | Liang | ................... | G01G 3/1402 |

* cited by examiner

WEIGHING DEVICE APPLICABLE MAGNETICALLY TO THE FORK OF A LIFTER WITH WIRELESS DATA CONNECTION

TECHNICAL FIELD

The present invention concerns the technical field of the machineries suitable for the support and/or lifting of loads, such as forklift trucks.

In particular way, the invention refers to an innovative weighing device applicable to load lifting or supporting surfaces, preferably the forks of a lifter.

BACKGROUND ART

Machineries for lifting and supporting loads, such as fork lifts or transpallets, have long been known.

For example, in the particular case of fork lifts, these are provided with forks that are generally mobile vertically in such a way that they can be lowered and lifted at will. In this way, it is possible to insert the forks under the load to then proceed with the lifting and transport of it to the pre-chosen place. In other cases the forks, apart from being provided with a vertical motion, are also provided with a horizontal motion that allows a reciprocal coming close and moving apart between them, in such a way as to easily grasp the objects, adapting to their different shapes and sizes.

A technical problem that is particularly felt concerns the need to weigh the goods that in general are moved with said fork lifts.

In the current state of the art, there exist ground weighing systems, of different shapes and sizes (ground scales). In this case, it is necessary to arrange specifically the load on the ground scale and this operation is certainly not easy and delays the subsequent movement operations.

In another case, weighing devices are foreseen that are directly integrated in the truck. In particular, the movement and lifting forks can have integrated particular weighing sensors communicating wireless with a processor or with specific instruments in such a way that it is possible to read the weight detected.

It is obvious that such solutions, even if precise and functional, require the substitution of the forks, the modification of the trucks or the purchase of appropriate instruments, which implies huge costs.

To that aim, document WO2007/014449 describes a weighing system applicable to pre-existing forks and represents the preamble of claim 1.

It describes a weighing system that is applied to the forks of a lifter and is provided with load cells which detect the weight of an overlying load.

Nevertheless, the weighing system described does not result easy for the application of the fork since a complex retain apparatus is necessary to fix it to the fork itself.

Moreover, such a weighing system is not much versatile since it is communicating via wire exclusively with its own specific device that detects the data measured by the load cells to then convert them into a weight value. The physical presence of the wire, together with the specific device that calculates and highlights the weight, precisely renders not much versatile and structurally complex the weighing system described.

Disclosure of Invention

It is therefore much felt in the field the need to have a weighing device 1 that can immediately be adapted to any kind of fork lift or lifter without requiring the entire substitution of the forks, resulting therefore adaptable also to old and pre-existing fork lifts.

It is also the aim of the present invention to provide a weighing device that can be used for any type of weighing every time there is the need to do so, and in different modalities.

Moreover, it is also the aim of the present invention to provide a weighing device 1 that gives also the possibility to integrate other instruments that are eventually available.

In particular, it is the aim of the present invention to provide a weighing device 1 that results easily and quickly applicable to the forks of a lifter or fork lift, resulting above all versatile and structurally simple.

These and other aims are therefore reached with the present weighing device 1 as per claim 1.

The weighing device (1) results applicable in a removable manner to the fork of a fork lift or of a lifter.

In particular, it foresees:
An external strip (3) to support the load to weigh;
A weighing device (4) arranged in such a way as to detect the weight of a load overlying the external strip.

In accordance with the invention, a magnetic element (2) is foreseen, arranged in such a way as to allow to apply magnetically the external strip (3) to the fork.

The weighing device (4) is further configured to communicate in wireless modality with an external device (200) for the reading of the datum of weight detected.

In this way, all said technical inconveniences are easily solved.

In particular, in an easy manner, it is now possible to adapt any fork lift or lifter so that it allows, at the moment of the lifting, to detect also the weight of the object lifted.

By simply applying magnetically the device to the fork every fork lift is rendered adaptable to the detection of a weight.

The wireless communication, above all, allows to read comfortably the weight on any external device already of common use, without the need to implement expensive apparatus and rendering the present device particularly versatile.

Advantageously, the magnetic element (2) is in the shape of a magnetic strip (2) or in the shape of one or more discrete magnets.

Advantageously, the external strip (3) is metallic.

Advantageously, the weighing device (4) comprises at least two load cells (4) distanced between them and arranged below the external strip (3).

Advantageously, the weighing device (4) further comprises an electronic card (100) programmed to send to the external device (200) the datum of weight received from the weighing device (4).

Advantageously, a video camera is foreseen.

Advantageously, said video camera is inserted in a fixing hole (21) obtained on the external strip (3).

Advantageously, said video camera is in the shape of an optical fiber or of a micro video camera.

Advantageously, one or more light sources are foreseen, preferably in the form of LEDs.

Advantageously, the external strip can be covered by an external layer of rubber.

BRIEF DESCRIPTION OF DRAWINGS

Further features and advantages of the device, according to the invention, will result clearer with the description that follows of some of its embodiments, made to illustrate but not to limit, with reference to the annexed drawings, wherein.

DESCRIPTION OF SOME PREFERRED EMBODIMENTS

Figure 1:
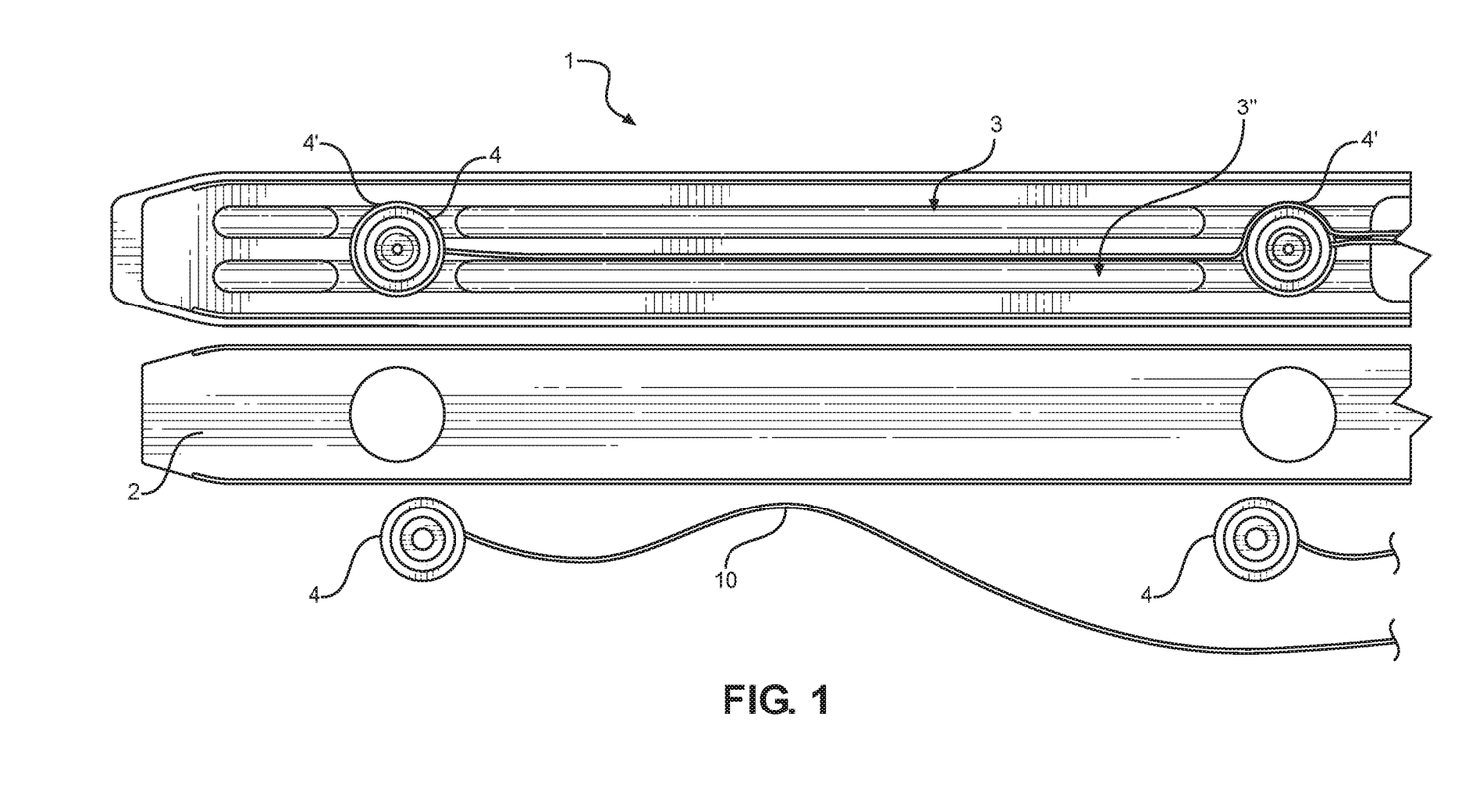
FIG. 1 represents the various separate main components that, when assembled, constitute the weighing device in accordance with the invention.

With reference to FIG. 1, a weighing device is described in accordance with the invention.

Figure 2:
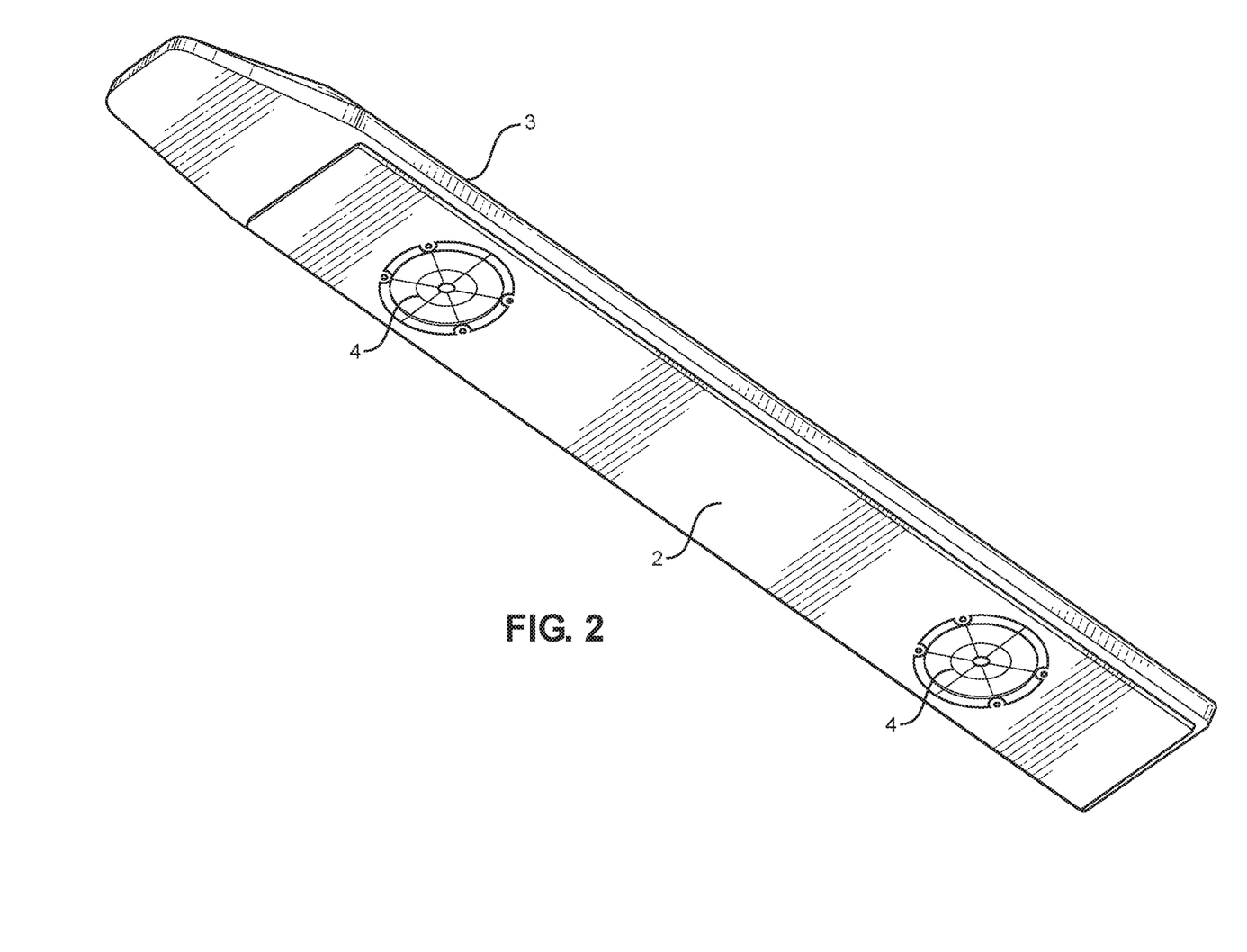
FIG. 2 shows an axonometric view wherein the weighing device is highlighted in accordance to the invention.

In particular, FIG. 1 shows the elements that compose it, which are disassembled, while FIG. 2 highlights the device assembled and ready for use.

FIG. 1 shows a first metallic surface 3 worked in the shape of a strip so that it traces the shape of the fork to which the device is destined to be applied.

Figure 3:
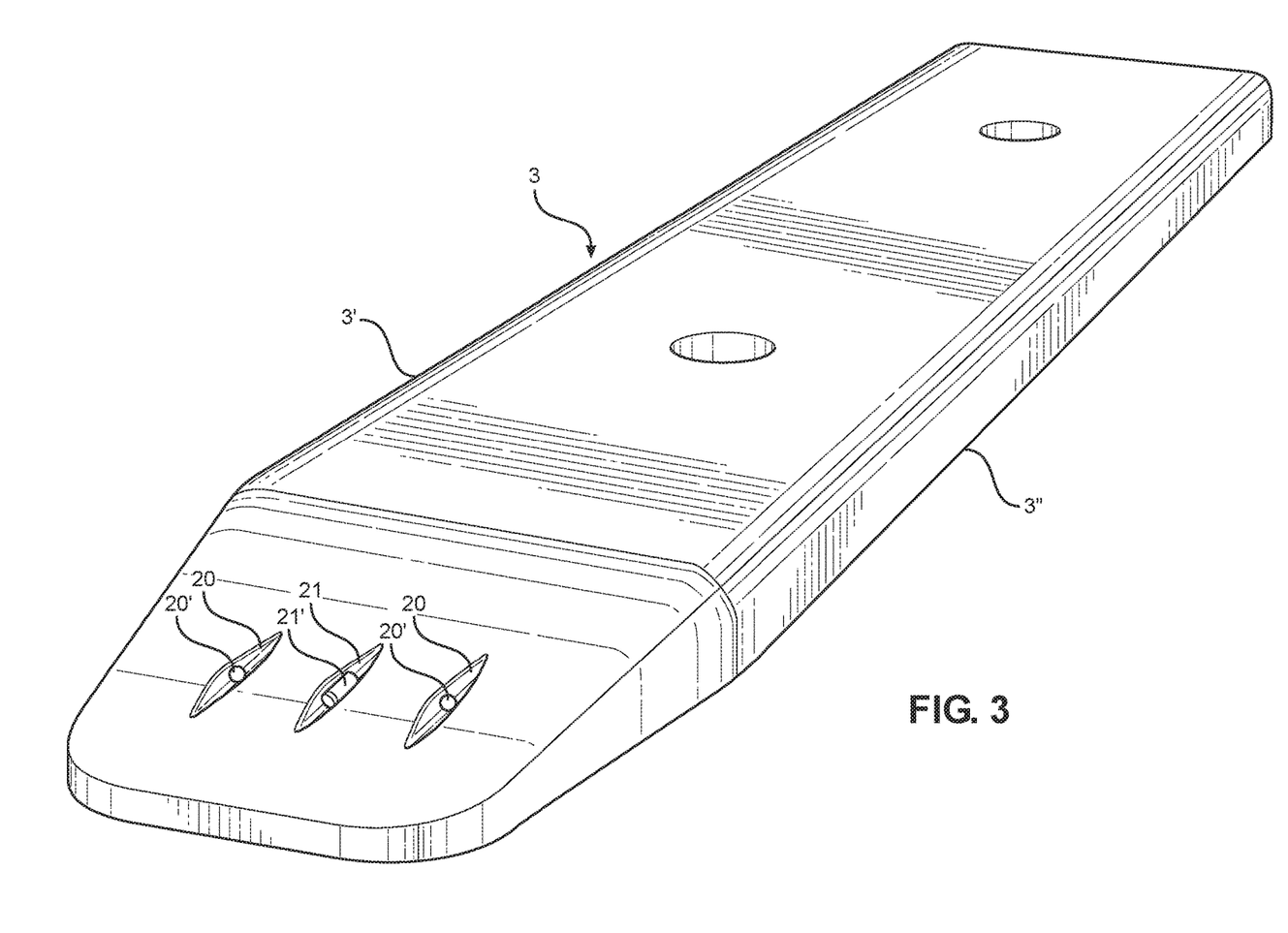
FIG. 3 is a further axonometric view wherein particular attention is made to the superior surface on which the object to weigh rests.

FIG. 3 shows very clearly, for example, the metallic strip 3 seen from the side of its superior surface 3', while FIG. 2 and FIG. 1 both show a view from the side of the inferior surface 3".

In use, the superior surface 3' is the one destined to be in contact with the load, while the component 2, described right below, is the one that adheres directly to the fork and allows the removable application of the entire weighing device 1.

Considering the entity of the loads that are generally moved and lifted with such fork lifts (weights sometimes much beyond the 100 kilos), the use of metallic material is preferred for the realization of the strip 3 even if other types of materials (for example, plastic) could be used.

As it is clearly understood from FIG. 1, the inferior surface 3" is worked in such a way as to lodge some electronic components and the feeding batteries thereof, described right below as well.

In particular, a cutting that traces the shape of a further magnetic strip 2 is foreseen, so that said magnetic strip can apply in correspondence of the surface 3".

Figure 7:
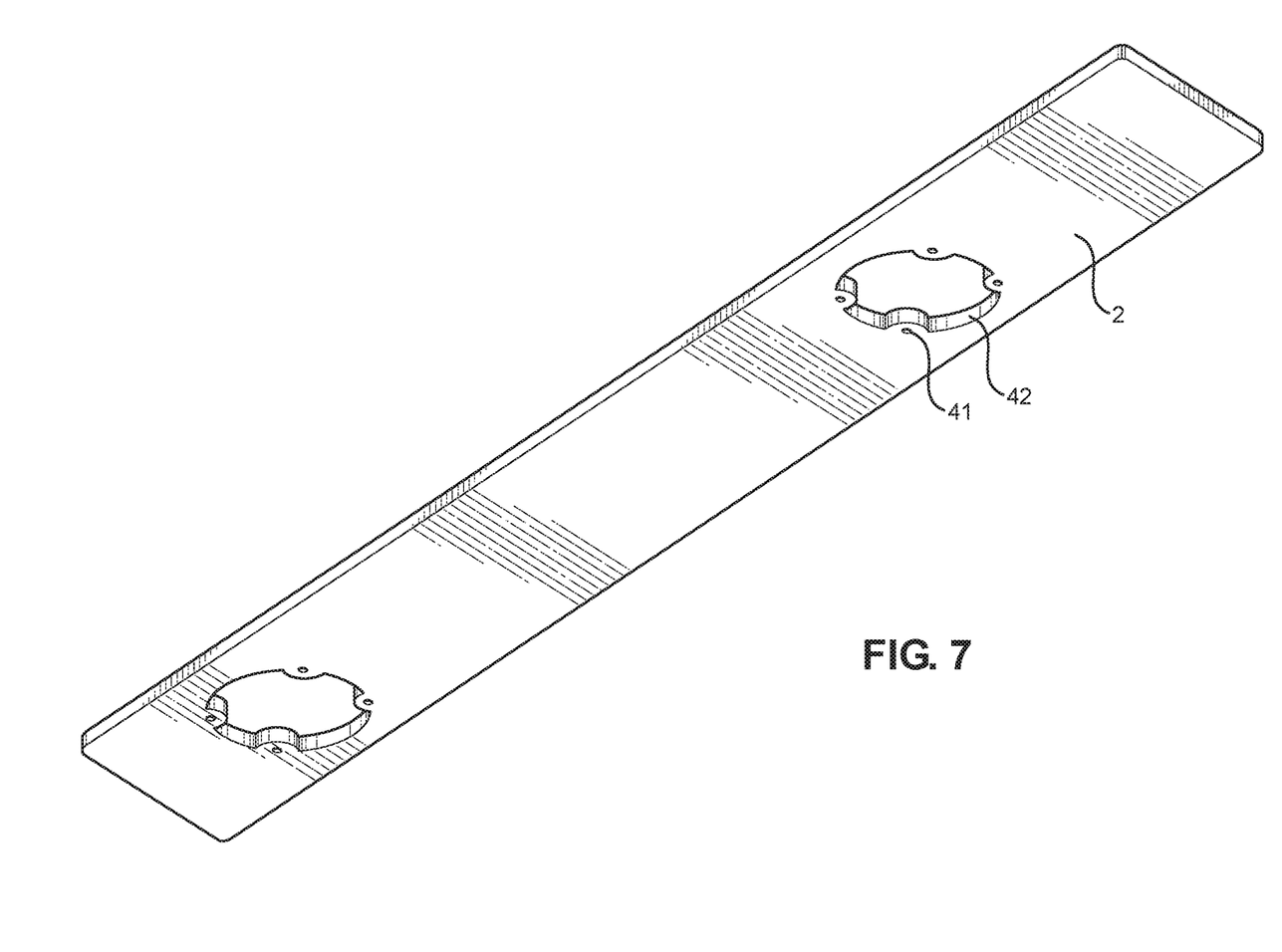
FIG. 7 shows just the magnetic plate with the holes for the fixing of the two load cells.

The magnetic strip is also highlighted in FIG. 7 and is obtained from a plasto-ferrite layer and is further reinforced by a further hardening metallic layer that adheres to the plasto-ferrite layer. In this way, the magnetic strip 2 acquires enough rigidity.

The fixing of the magnetic strip 2 can take place by means of screws or by gluing, for example.

In a variant, the magnetic strip can be substituted by one or more discrete magnets applied on a hardening metallic plate or directly to the metallic strip 3.

As always shown in FIG. 1, two load cells 4 are applied precisely in correspondence of the inferior surface 3" inside the cutting.

In particular, inside the cutting, two seats 4' are obtained in which the load cells are lodged. If the load cells are circular, then the seats are circular.

The seats form receiving receptacles that allow a stable fixing of the load cells and that, above all, represent two references for the fixing.

The load cells are fixed with adhesive glues, rubber inserts or by means of screws.

Figure 11:
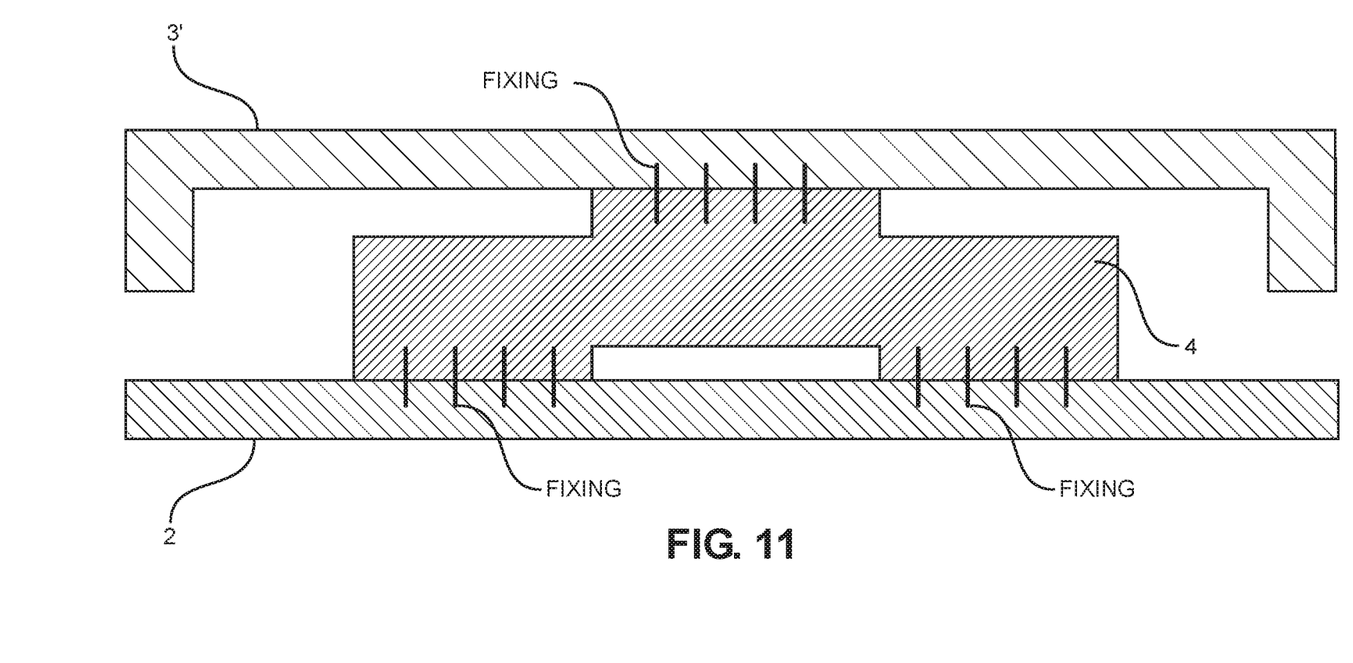
FIG. 11 schematizes the mechanical connection between load cell and superior and magnetic strip.

In particular, as always schematized in FIG. 11, in the preferred embodiment of the invention, the load cell 4 connects on one side, by means of screws, inserts or glue, to the surface 3" of the strip 3, while, contextually, the magnetic component 2 is fixed to the load cells 4 on the opposite side, always by means of screws, inserts or glue.

Figure 5:
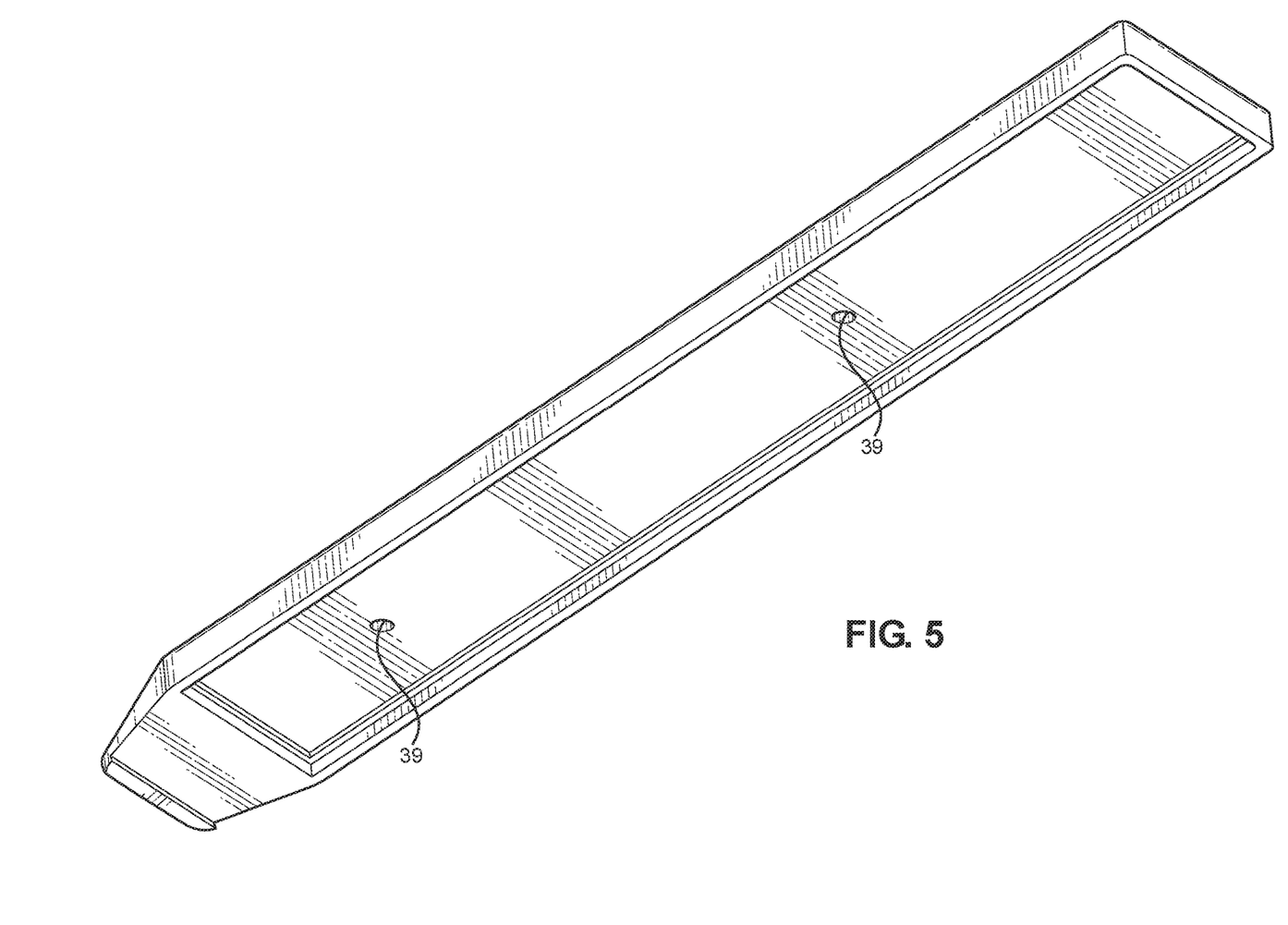
FIG. 5 is a further axonometric view from the bottom that highlights the weighing device wherein the two load cells have been removed.
Figure 6:
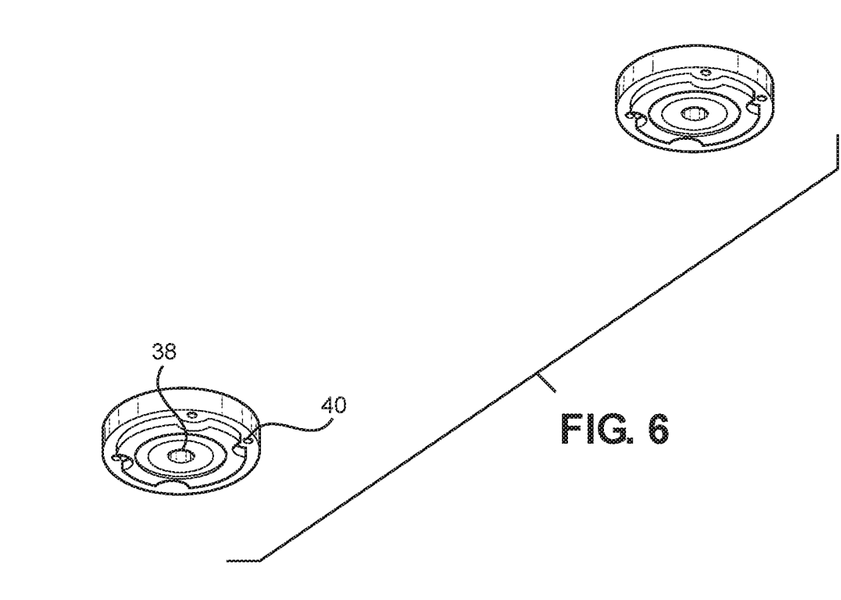
FIG. 6 shows the two load cells.

For example, FIG. 6 and FIG. 7 schematize the shape of the load cells provided with holes 40 that couple with the eyelets 41 obtained in the magnetic strip 2 at the edge of opening 42 precisely for the passage of screws or fixing inserts. FIG. 5 instead shows the holes 39 for the fixing of the load cells to the metallic strip 3 through the central hole 38.

In a further variant nothing would impede to connect (for example to glue) the magnetic strip 2 to the surface 3" and foresee the fixing of the cells 4 just to the surface 3".

Figure 4:
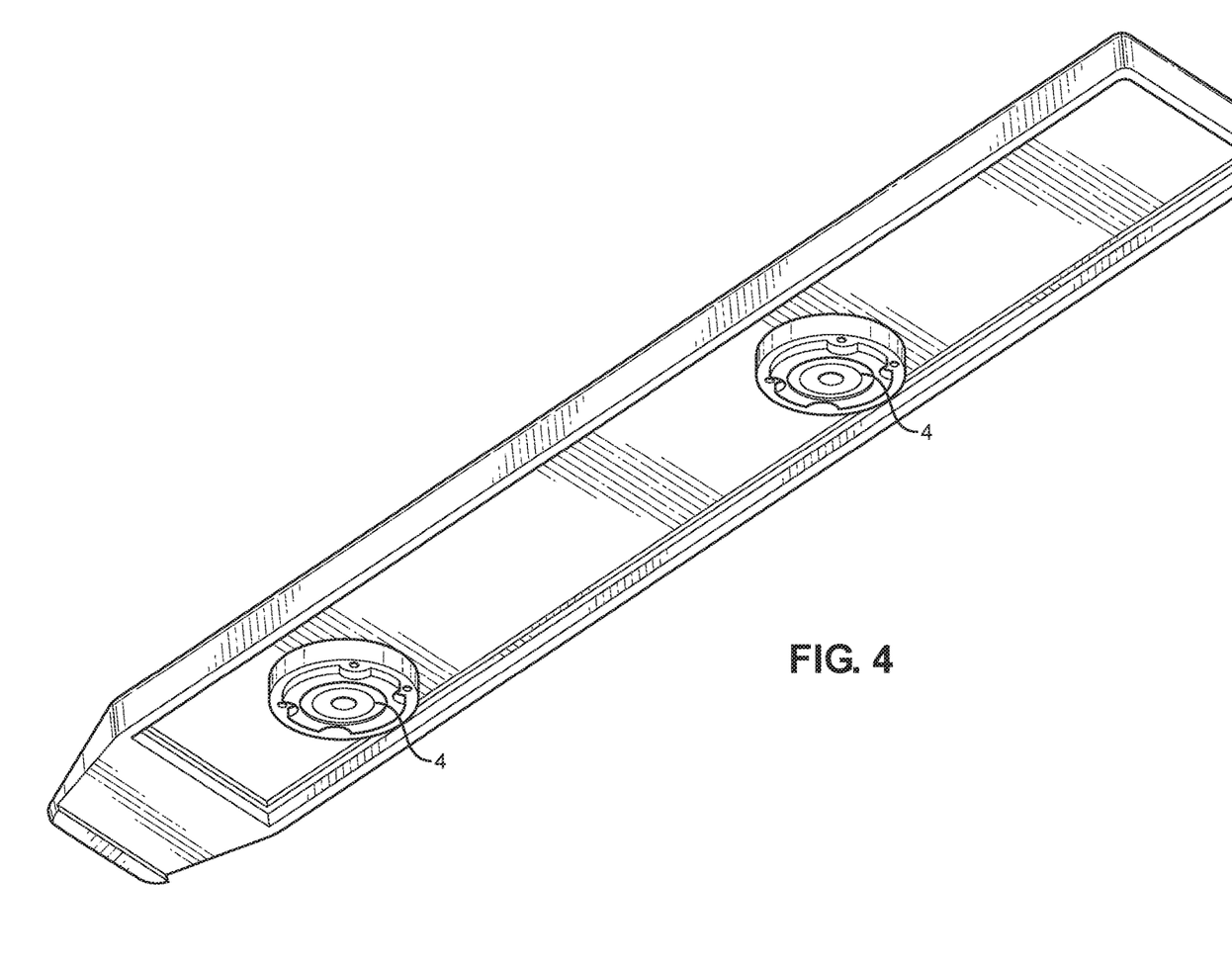
FIG. 4 is an axonometric view from the bottom wherein the metallic/magnetic layer (or the magnetic plate) has been removed in such a way as to highlight the two load cells that serve to detect the weight.

FIG. 4 schematizes very clearly the application of the two load cells 4 in the specific seats 4' and fixed, as said, by means of a screw or insert (or also glued). To that aim, always in FIG. 4, the underlying magnetic strip, which would close the whole, has been omitted.

It is noted how in the magnetic strip 2 two passing holes are foreseen through which the two load cells face the outside. In that way, in use, the two load cells rest directly on the surface of the fork, allowing to obtain a more precise measure of the weight detected and a minor thickness of the whole device.

It is clear that in a further variant of the invention, the magnetic strip could also not be provided with said holes and, in that case, the two cells would result completely contained within the space comprised between the magnetic strip and the superior metallic strip 3.

It is important that there are at least two load cells distanced between them in such a way that the whole weighing device (in the shape of a strip) can rest in a stable manner on the forks and detect a correct weight.

FIG. 1, just for clarity purposes, shows a pair of load cells assembled in position and a further pair placed aside, just with the aim of visualizing well the shape of the load cells themselves.

The load cells, as it is well known in the state of the art, serve to detect electronically the weight when a load acts on them.

A load cell is therefore an electronic component (transducer) employed to measure a force applied on an object (in general a mechanical component) through the measure of an electric signal that varies due to the deformation that such a force produces on the component.

The deformation of the load cell subject to the weight allows the electronic detection of a weight.

Other weight transducers different from the load cells can be used. For example, some transducers are in the shape of closed pipes in which the pressure of the gas-liquid contained inside varies when the weight applied varies.

Always as shown in FIG. 1, the electric wires 10 are highlighted that transmit the signal detected by the load cells to the electronic card 100 that finds lodging inside the device 1 itself.

Figure 10:
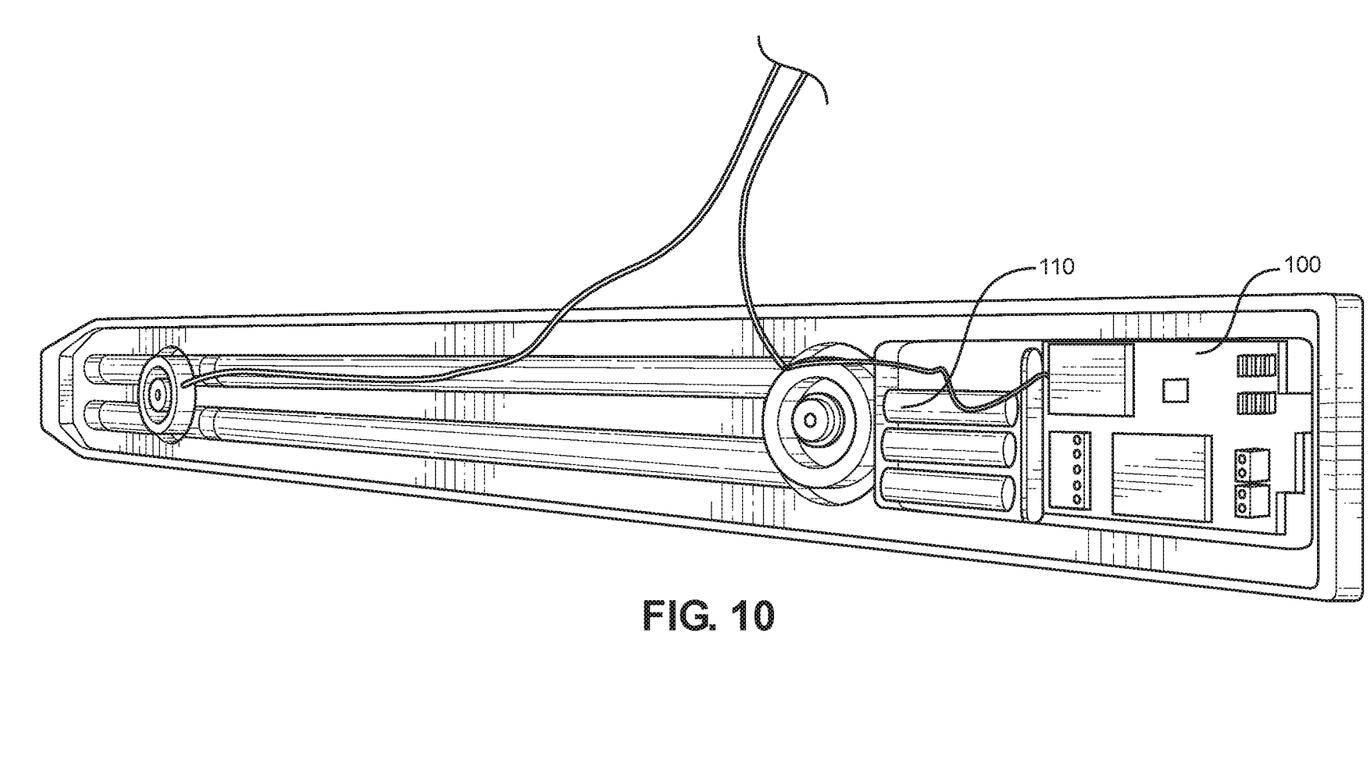
FIG. 10 further shows the overturned device with the magnetic plate removed in order to highlight again the two load cells, the feeding battery and the electronic card 100.

FIG. 10 shows the electronic card 100 connected to the load cells and the electric feeding through the batteries 110.

Figure 12:
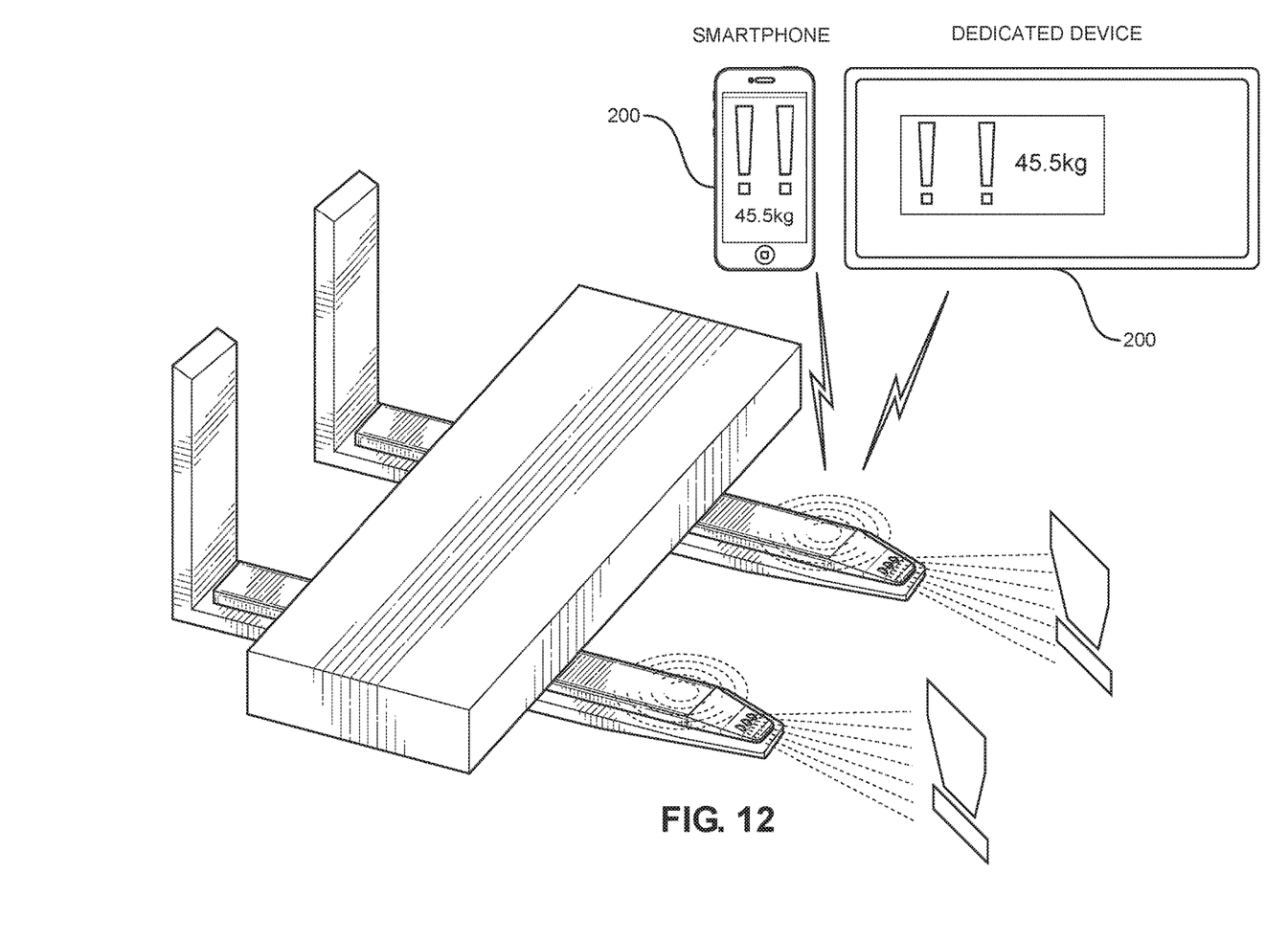
FIG. 12 schematizes the wireless communication between the electronic card of management of the load cells and an external apparatus 200, such as an electronic processor, a PC, a mobile phone of the I-phone type, a smartphone, etc.

The weight data detected by the load cells are processed by the electronic card 100 appropriately programmed and which manages the wireless transmission to an external reception instrument 200, which can be a smartphone, an I-phone, a dedicated device, a computer, etc. (see to that aim FIG. 12).

In this way, the user can comfortably read the weight data measured from remote.

FIG. 3 shows, in correspondence of the superior surface 3, the presence of three holes (20, 21) in which lights 20' (for example LEDs in the holes 20) and a video camera 21' (for example in the shape of optical fiber or a real micro video camera inserted in the central hole 21, for example) are inserted, respectively.

The micro video camera can therefore be of those of the type installed in PCs or surveillance micro video cameras. They have integrated already all the electronics necessary to acquire the images.

Obviously, the video camera and the lights will have an electric wire that will put them in communication with the electronic card 100. Also in this case the electronic card will manage the wireless transmission of what has been taken by the video camera to the external device 200. The operator can thus visualize comfortably what has been taken by the video camera.

The external reception device 200 can also be further programmed in order to manage more signals contemporarily.

This is the case, for example, in which it is necessary to weigh a very long object, such as a pole. In this case, a fork lift with three or four forks could be necessary. Relative devices 1 can then be arranged, each one of them placed on a fork and each one detecting a part of the total weight. Each device 1, through its own electronic card 100, will send via wireless (without wires) the signal to the external device 200 (for example an I-phone). The I-phone will foresee a specific application in which it is possible to pre-set the overall number of the weighing devices active and so that the I-phone recognizes them and is capable of managing them simultaneously, obtaining the final result of weight and the eventual images received from each one of them.

In use, therefore, the functioning is the following.

Figure 8:
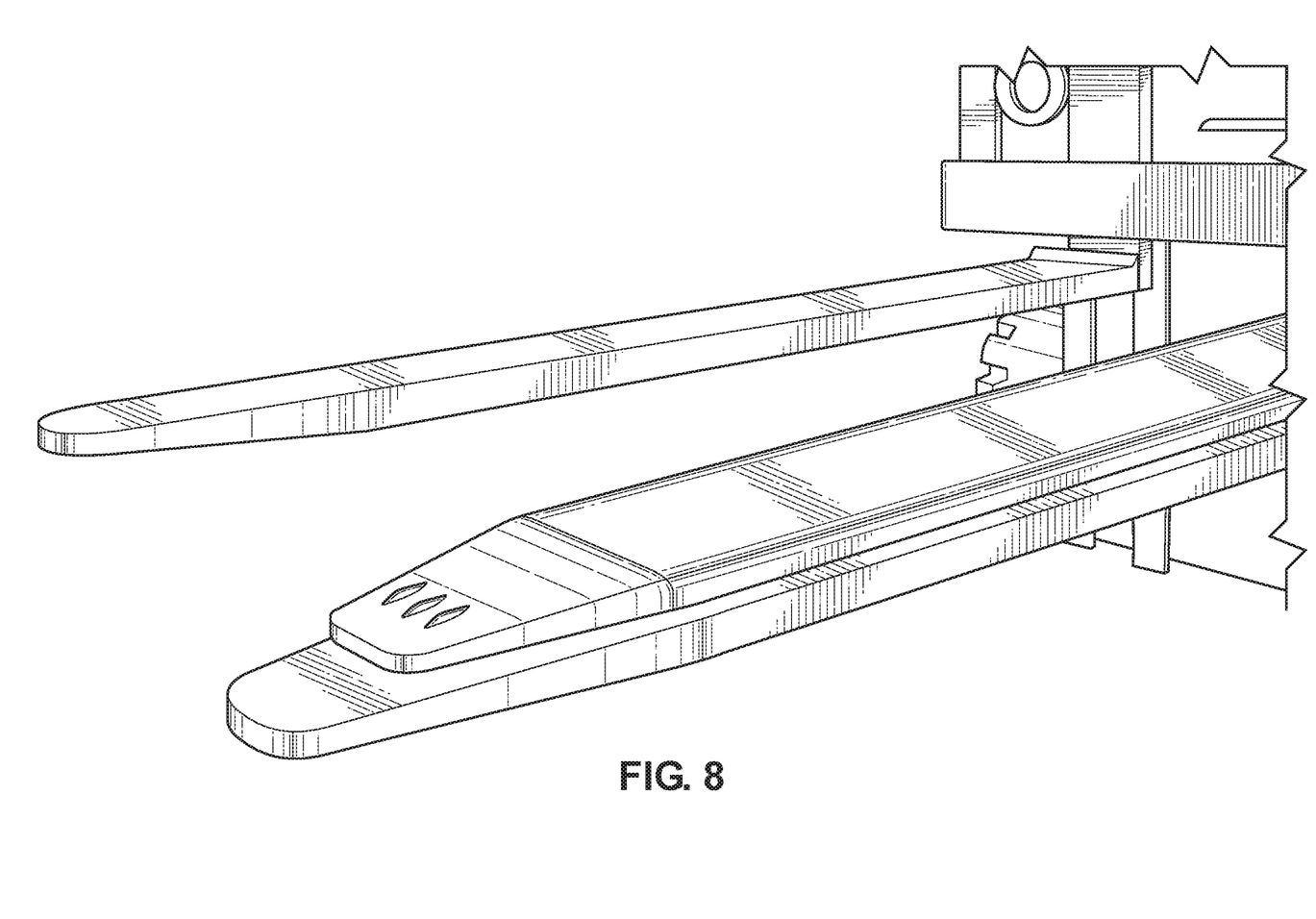
FIG. 8 and FIG. 9 show the device applied to the fork of a fork lift.

As shown in FIG. 8, thanks to the presence of the magnetic strip, the weighing device 1 can be easily applied, in a removable manner, on the metallic forks of the lifter. The magnet creates a magnetic field that makes that the device attaches to the fork in a stable but, at the same time, removable manner.

In this way, it is possible to apply such a device on any lifter (also not arranged per se for the detection of the weight), allowing to detect the weight of the loads lifted.

Figure 9:
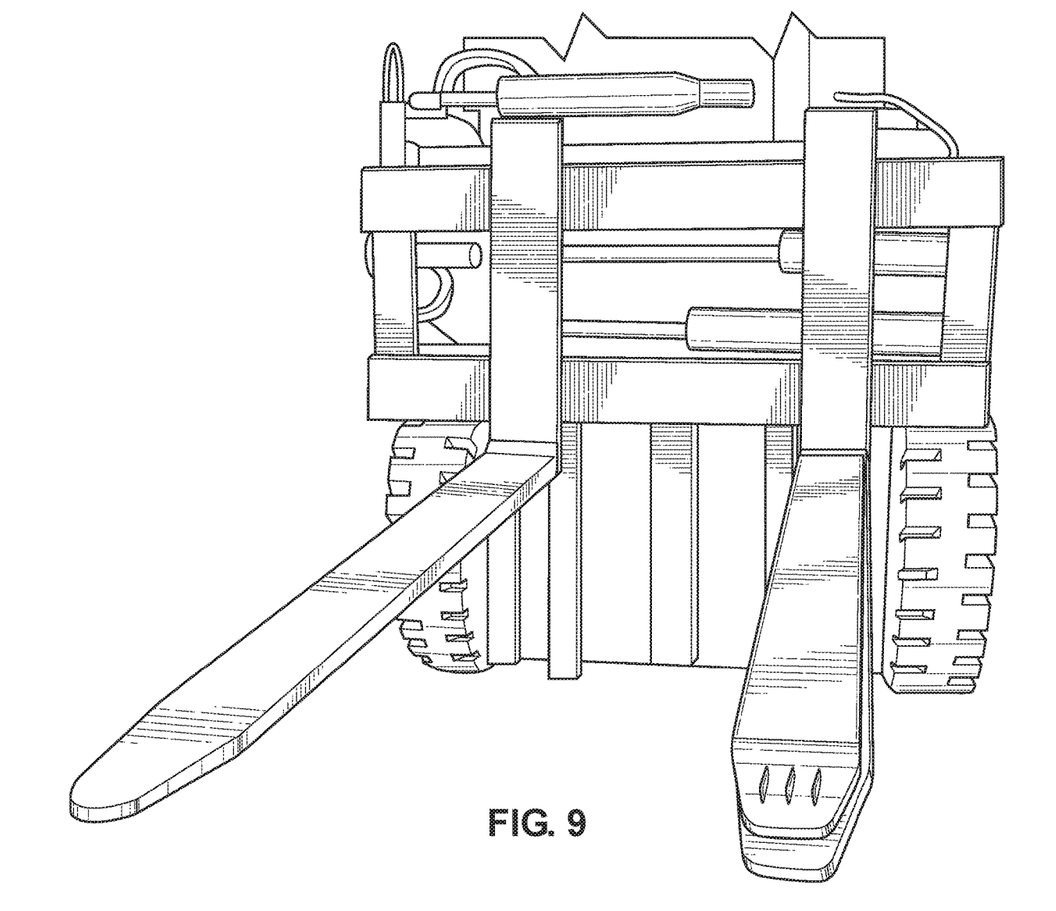

The metallic strip 3 can have any length but, preferably, covers almost entirely or entirely the length of the fork in such a way as to support well the loads that the fork lifts (see also FIG. 9) and with the load that rests entirely on the device.

The same metallic strip could be covered with an external rubber layer in such a way as to avoid to scratch the load lifted, even if it is not essential; for example, the rubber is not essential in the case in which the load to lift is covered by wood (closed in an external wooden box or a box of another protective material) or material that hardly gets scratched.

In that sense, the device described can be constituted just by the metallic strip and by the underlying magnetic strip.

Once such a device is applied to the forks of the lifter and once the weight has been detected, the same load can eventually be moved in the desired position.

To that aim the video camera is used, which allows to see visually in what position the fork itself is found. That can, for example, become necessary when the pallet has to be positioned at high altitudes. The video camera allows to verify exactly the altitude reached by the forks and to allow to make a retrieval/positioning that is precise without the risk of accidental falls of the load or of break-through of the pallet to retrieve.

The integrated lights (also just a LED, for example) are very functional since they do not just improve the quality of the take buy can also substitute the video camera in the manoeuvers of retrieval and positioning. The luminous beam that illuminates in fact creates for the operator a reference on the actual altitude reached during the movement operations.

To that aim, the present invention can present the combination of the video camera with the lights, or just the video camera, or just the lights.

In the current state of the art, in fact, the retrievals/positionings in altitude are difficult and require the aid of an operator that has to go up in altitude together with the fork, risking falls.

It is clear that the weighing device that is the object of the present invention can be applied in use to any mobile lifting surface, not just to the forks of a fork lift or a lifter. Moreover, it is clear that in a comfortable way they can be used also on a fixed surface, for example metallic but also on the ground, on which the object to weigh is placed (for example a car that is positioned on such a device 1 placed on the ground).

It is clear also that the present video camera could be integrated in a device formed just by the metallic strip and by the underlying magnetic strip, without that the device has the load cells and therefore just with the aim of visualizing the operations of retrieval/positioning and not of weighing.

In that case, preferably but not necessarily, the device foresees a covering rubber layer since it is mainly destined to the transport of the load and not to the weighing.

In this way, an easy device applicable magnetically to any type of pre-existing fork would be obtained and whose function is that of guiding the operator in the movements of the loads with the aid of the video camera.

In particular, advantageously, a video-take and load-movement device can be foreseen, and applicable in a removable manner to the fork of a fork lift or of a lifter and comprising:
An external strip (3);
A magnetic element (2) arranged in such a way as to allow to apply magnetically the external strip (3) to the fork;
A video camera.

Advantageously, a hole (21) is foreseen in the external strip (3) in which said video camera is lodged, preferably the video camera being in the shape of optical fiber or micro video camera.

For this variant of the invention, structurally, all what has been described (therefore also the lights) is considered to be comprising and valid except, obviously, for the weight sensors that are not present.

The invention claimed is:

1. A weighing device to be removably coupled to a fork of a forklift or of a lifter comprising:
    an external strip to support a load to weigh, the external strip being dimensioned to be entirely disposed above the fork and having an upper surface and a lower surface, the lower surface having a cavity defined therein;
    a magnetic element disposed below the external strip and magnetically coupling the external strip to the fork; and
    one or more weight sensors disposed between the external strip and the magnetic element,
    wherein the cavity has a same perimeter as the magnetic element,
    wherein the magnetic element has one or more openings dimensioned to receive a central portion of the one or more weight sensors, and
    wherein the weighing device is configured to communicate wirelessly with an external device adapted to read weight information detected by the weight sensors.

2. The weighing device of claim 1, wherein the magnetic element is configured as a magnetic strip.

3. The weighing device of claim 1, wherein the magnetic element is configured as one or more discrete magnets.

4. The weighing device of claim 1, wherein the external strip is metallic.

5. The weighing device of claim 1, wherein the one or more weight sensors comprise at least two load cells disposed with a distance between each other.

6. The weighing device of claim 1, further comprises an electronic card coupled to the lower surface of the external strip and programmed to send the weight information received to the external device.

7. The weighing device of claim 1, further comprising a video camera.

8. The weighing device of claim 7, wherein the video camera is inserted in a fixing hole defined in the upper surface of the external strip.

9. The weighing device of claim 7, wherein the video camera acquires images via an optical fiber or is a micro video camera.

10. The weighing device of claim 1, further comprising one or more light sources disposed in one or more openings defined in the upper surface of the external strip.

11. The weighing device of claim 10, wherein the one or more light sources are LEDs.

12. The weighing device of claim 1, wherein the upper surface of the external strip is covered by a layer of rubber.

* * * * *